United States Patent [19]

Mochinaga

[11] Patent Number: 5,079,639
[45] Date of Patent: Jan. 7, 1992

[54] HAND-HELD, MANUALLY SWEEPABLE IMAGE DATA PROCESSING APPARATUS

[75] Inventor: Nobuyuki Mochinaga, Tokyo, Japan

[73] Assignee: Casio Computer Co., Ltd., Japan

[21] Appl. No.: 475,361

[22] Filed: Feb. 5, 1990

[30] Foreign Application Priority Data

Feb. 10, 1989 [JP] Japan ................................. 1-29899
Feb. 10, 1989 [JP] Japan ................................. 1-29900

[51] Int. Cl.$^5$ ........................................... H04N 1/024
[52] U.S. Cl. ................................ 358/473; 358/497; 346/76 PH; 382/59
[58] Field of Search ............... 358/472, 473, 497; 346/76 PH, 143; 382/59

[56] References Cited

U.S. PATENT DOCUMENTS

| | | | |
|---|---|---|---|
| 3,767,020 | 10/1973 | Rowe | 101/93 C |
| 4,523,235 | 6/1985 | Rajchman | 346/76 PH |
| 4,750,049 | 6/1988 | Murakami et al. | 346/76 PH |
| 4,785,357 | 11/1988 | Dreyfus et al. | 358/473 |
| 4,894,730 | 1/1990 | Yanagawa et al. | 358/473 |
| 4,899,228 | 2/1990 | Sano et al. | 358/473 |
| 4,912,561 | 3/1990 | Homda | 358/473 |
| 4,969,054 | 11/1990 | Tsuji et al. | 358/473 |

FOREIGN PATENT DOCUMENTS 0183980  6/1986  European Pat. Off. ............ 358/473

Primary Examiner—Edward L. Coles, Sr.

[57] ABSTRACT

A handy copier comprising a case, an image sensor located in the case, a memory also located in the case, and a printer incorporated in the case. As the case is moved on an original, the image sensor reads the image data formed on the original, and the image data is stored into the memory. As the case is moved on a printing medium, the printer prints the image data stored in the memory, on the printing medium. The memory address of the memory, which is being accessed when the case is stopped for a predetermined period during the data-reading operation, is stored in an address memory incorporated in the case. This address separate one image date item from the next. Hence, image data items continuously read from the original are read from the memory, one by one, and are printed on the printing medium, one by one. Also, even if the case is stopped for the predetermined period, the printer is prepared to print the next image data item.

32 Claims, 4 Drawing Sheets

HAND-HELD, MANUALLY SWEEPABLE IMAGE DATA PROCESSING APPARATUS

BACKGROUND OF THE INVENTION

1. Field of the Invention

The present invention relates to a hand-held, manually sweepable image data processing apparatus which has a memory and which reads image from an original and stores the image data into the memory, as it is manually swept over the original, and/or prints image data stored in the memory on a printing medium, as it is manually swept over the printing medium.

2. Description of the Related Art

Hand-held, manually sweepable image data processing apparatuses, such as handy copiers, handy scanners, and handy printers, have been put to practical use.

Handy copiers and handy scanners are designed to read image from an original. They either an external memory or an internal memory for storing the image read from the original. With each of these apparatuses, a user must perform a specific operation to store data items, one by one, separated from one another, into the memory so that any of these data items can be individually accessed later.

On the other hand, handy copiers and handy printers have also a memory and are designed to print the image data stored in the memory, on a printing medium. When the data items are stored in the memory, separated from one another, a user needs to perform a specific operation to print one image data items after another data item has been printed.

Hence, if the user makes an error in performing the specific operation on the handy copier, handy scanner, or a handy printer, it is possible that different data items are stored into the memory as if they were a single data item, or the same data item is unnecessarily printed a number of times.

SUMMARY OF THE INVENTION

Accordingly it is an object of the present invention to provide a hand-held, manually sweepable image data processing apparatus which has a memory and can store different data items into the memory, automatically separated from one another.

Another object of the invention is to provide a hand-held, manually sweepable image data processing apparatus which has a memory and can automatically renew and sequentially output image data items stored in the memory, separated from one another.

To accomplish the first object described above, according to the invention, there is provided an image data processing apparatus which comprises: housing means movable on a material having image information; input means carried by the housing means and designed to contact the material when the housing means is moved on the material and to produce image data from the image information; memory means for storing the image data produced by the input means; movement-detecting means for detecting movement of the housing means with respect to the material; and memory control means for controlling the memory means in accordance with the movement of the housing means, which has been detected by the movement-detecting means, and for separating the image data into a plurality of image data items, each produced by the input means while the housing means is being moved continuously.

To attain the second object described above, according to the invention, there is provided an image data processing apparatus which comprises: input means for inputting a plurality of image data items; memory means for storing the image data items input by the input means; housing means designed to be moved on a printing medium; printing means carried by the housing means and designed to contact the printing medium and to print the image data items stored in the memory means, on the printing medium while the housing means is being moved on the printing medium; movement-detecting means for detecting movement of the housing means with respect to the printing medium; data-selecting means for sequentially selecting the image data items stored in the memory means, selecting each image data item when the detecting means detects that the housing means stops moving; and data-supplying means for supplying the image data item selected by the data-selecting means, from the memory means to the printing means, in accordance with the movement of the housing detected by the movement-detecting means.

The image data processing apparatus according to the present invention, which has the specific structure described above, can store different data items into a memory, reliably separated from one another, and can also automatically and sequentially read different data items stored in the memory, separated from one another, even if the user makes an error in performing the data-storing operation or the data-reading operation. Hence, the image data processing apparatus is user-friendly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described, with reference to the accompanying drawings.

Figure 1:
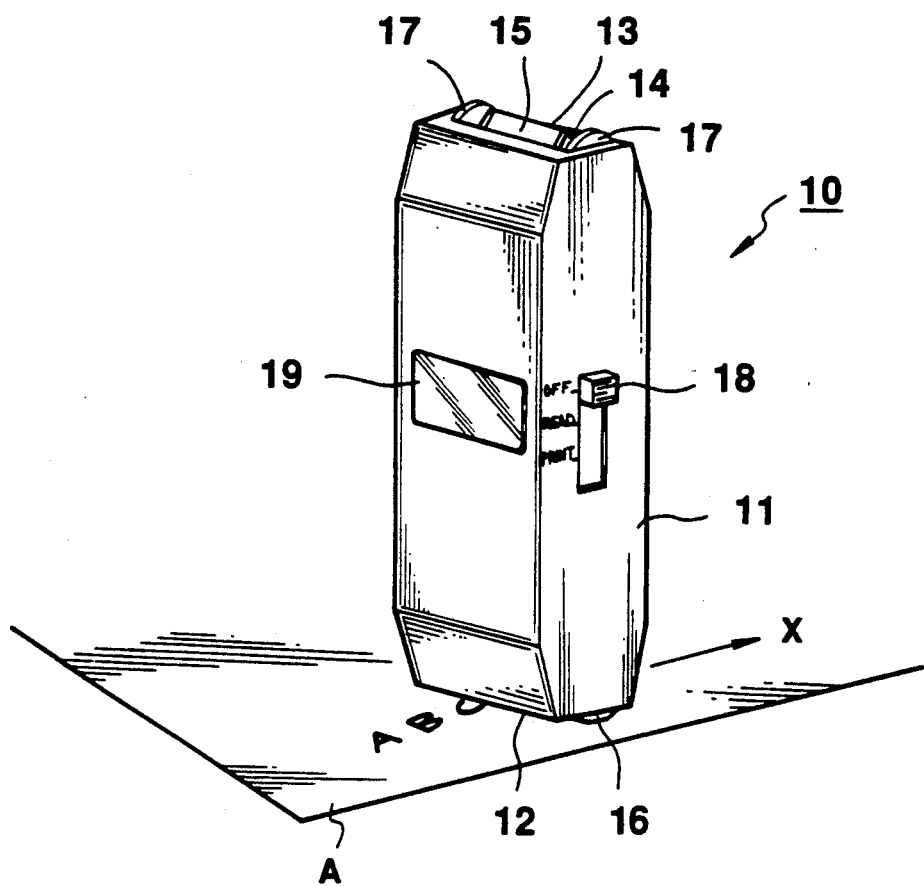
FIG. 1 is a perspective view illustrating a handy copier which is an embodiment of the present invention.

FIG. 1 is a perspective view showing a handy copier 10 according to this invention. As is illustrated in FIG. 1, the handy copier 10 comprises a case 11 which is small enough to be held by hand and moved on an original A or a printing medium B.

The handy copier 10 further comprises a data-reading section 12 and a data-printing section 13. The data-reading section 12 is located in the first end of the case 11, and the data-printing section 13 is attached to the second end of the case 11.

Figure 2:
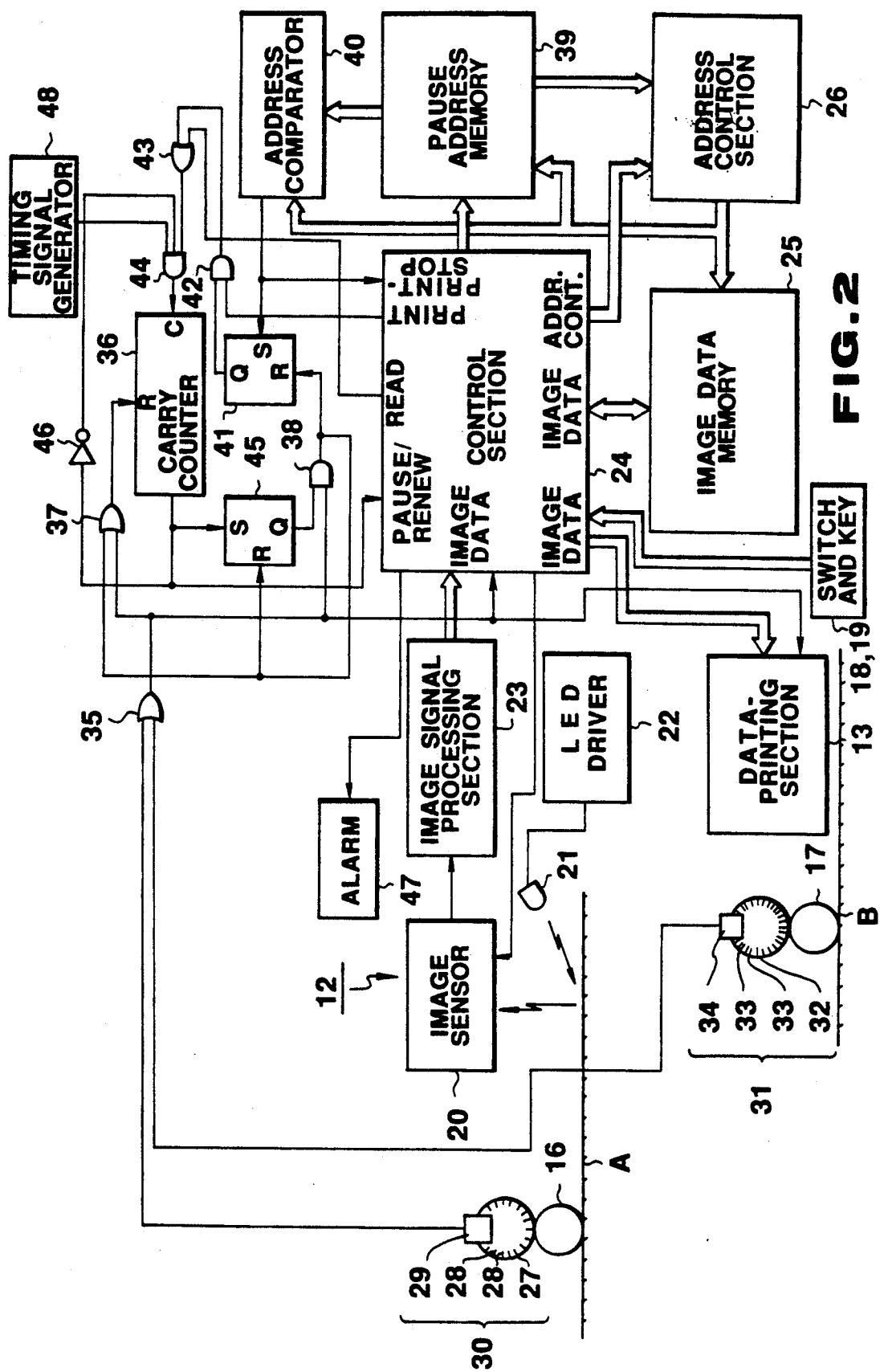
FIG. 2 is a block diagram showing the circuitry of the handy copier illustrated in FIG. 1.

As is shown in FIG. 2, the data-reading section 12 has an image sensor 20 and an LED array 21. The LED array 21 functions as a light source for applying light onto the original A as the case 11 is moved on the original A. The sensor 20 reads the image formed on the original A from the light reflected from the original A.

The data-printing section 13 has a thermal print head 14 and a thermal-transfer ink ribbon 15. The print head 14 is operated, and the ink ribbon 15 is fed from a roll (not shown), as the case 11 is moved on the printing medium B. As a result of this, the image read by the data-reading section 12 is printed on the printing medium B.

As is illustrated in FIGS. 1 and 2, the handy copier 10 further comprises paper-contacting rollers 16 and 17. The roller 16 is located close to the data-reading section 12, whereas the roller 17 is located adjacent to the data-printing section 13. The roller 16 is attached to the case 11 such that it slightly protrudes from the first end of the case 11; it contacts the original A and rotates as the case 11 is moved on the original A. Similarly, the roller 17 is attached to the case 11 such that it protrudes a little from the second end of the case 11; it contacts the printing medium B and rotates as the case 11 is moved on the printing medium B.

As FIG. 1 clearly shows, a power/mode switch 18 is provided on one side of the case 11. The switch 18 can take three positions, i.e., a power-off position, a read-mode position, and a print-mode position. Also, an operation key 19 is provided on the front of the case 11. When this key 19 is pushed, the handy copier 10 reads the image from the original A as the case 11 is moved on the original A, if the power/mode switch 18 is set at the read-mode position, or print the image on the printing medium B as the case 11 is moved on the medium B, if the power/mode switch 18 is set at the print-mode position.

As can be understood from FIG. 2 which illustrates the circuitry of the handy copier 10, the data-reading section 12 has an LED driver 22, in addition to the image sensor 20 and the LED array 21. The image sensor 20 is a one-dimensional image sensor made of a CCD (Charge-Coupled Device) which has an effective read width of 8 mm and an image resolution of 8 dots/mm. The sensor 20 extends at right angles to the direction in which the case 11 is moved on the original A. The LED array 21 comprises a plurality of LEDs arranged in the same direction as that of the image sensor 20. The LEDs are turned on under the control of the LED driver 22, thus applying light onto the original A.

The light applied from the LED array 21 is reflected from the original A. The reflected light is applied onto the image sensor 20. The sensor 20 converts the light into electric signals, or image signals, which represent the image formed on the original A.

As is shown in FIG. 2, the handy copier 10 comprises an image signal processing section 23, a control section 24, an image data memory 25, and an address control section 26—all located within the case 11. The image signal processing section 23 receives the image signals output by the image sensor 20, and converts them into 8-bit parallel image data in accordance with the levels of the image signals. This parallel image data represents the white dots and black dots defining the image formed on the original A. The 8-bit image data is supplied the control section 24 and is eventually stored into the image data memory 25. The image data memory 25 has a storing area of 3200 bits in row direction and 64 bits in column direction.

That is, the image data memory 25 has a storage capacity of 204.8 kB (Kilobits). This storage capacity is equal to the amount of data which the image sensor 20 outputs every time it is moved 400 mm on the original A. More specifically, the sensor 20 outputs 64 bits every time it is moved $\frac{1}{8}$ mm since its effective read width is 8 mm and its resolution is 8 dots/mm, one dot being equivalent to one bit—that is, 8 mm × 8 bits/mm = 64 bits. Thus, the sensor 20 produces 204.8 KB every time it is moved 400 mm on the original A—that is, {64 bits/mm × (400 × 8)mm} = 204,800 bits.

The address control section 26 designates some of the addresses of the image data memory 25 under the control of the control section 24. The image data is written into, or read from the image data memory 25 in accordance with the address disignated by the address control section 26.

The handy copier 10 further comprises two encoders 30 and 31, two OR gates 35 and 37, a counter 36, and an AND gate 38—all located within the case 11.

The first encoder 30 comprises an encoder disk 27 and a detector 29. The disk 27 is coupled to the paper-contacting roller 16, and has a number of slits 28 which extend in the radial direction of the disk 27 and equally spaced from one another in the circumferential direction of the disk 27. The detector 29 has an LED and a photosensor (either not shown). The LED and the photosensor are located on the sides of the disk 27, respectively, such that the light emitted from the LED can pass through one of the slits 28 and reach the photosensor. Hence, as the roller 16 rotates when the case 11 is moved on the original A, the light emitted from the LED is intermittently applied to the photosensor, whereby the photosensor generates signals one after another. The encoder 30 therefore outputs a signal every time the case 11 is moved on the original A for a predetermined distance.

The second encoder 31 is identical to the first encoder 30 in structure. It comprises an encoder disk 32 coupled to the paper-contacting roller 17 and having a plurality of radial slits 33, and a detector having an LED and a photosensor (either not shown). The second encoder 31 performs the same function as the first encoder 30. That is, it outputs a signal every time the case 11 is moved on the original B for a predetermined distance.

The signals output by the encoders 30 and 31 are supplied via the OR gate 35 to the control section 24 and also to the data-printing section 13. They are also supplied to the AND gate 38 and through the OR gate 37 to the reset terminal R of the counter 36, which will be later described in detail.

When the power/mode switch 18 is set at the read-mode position, the control section 24 stores the image data obtaining by image sensor 20 into the image data memory 25 in synchronism with the signals output from the first encoder 30. More precisely, every time the case 11 is moved for $\frac{1}{8}$ mm on the original A. The first encoder 30 outputs a signal to the control section 24 by the OR gate 35. In synchronism is this signal output from the first encoder 30, the control section 24 supplies the image signal obtained by the image sensor 20 to the image data processing section 23. Further, the control section 24 controls the address control section 26 and supplies the image data obtained by the image signal processing section 23 to the image data memory 25. The address control section 26 sequentially designates the address with respect to the column of one of the rows of the image data memory 25, whereby the image data is stored in one column of the image data memory 25, or at the address designated by the control section 26.

On the other hand, when the power/mode switch 18 is set at the print-mode position, the control section 24 controls the address control section 26 so that the image data items stored in the memory 25 are sequentially supplied to the data-printing section 13 in response to the signals output by the second encoder 31. More precisely, every time the case 11 is moved ⅛ mm on the printing medium B, the second encoder 31 outputs a signal to the control section 24 through the OR gate 35. In response to the signal output from the second encoder 31, the control section 24 controls the address control section 26. The address control section 26 designate address with respect to one of the rows of the image data memory 25, whereby the image data is read from the memory 25 based on the address designated by the control section 26 and is supplied to the data-printing section 13 through the control section 24. The data printing section 13 prints the image data supplied from the image data memory 25 in synchronism until the signals output second encoder 31.

As is evident from FIG. 2, the handy copier 10 further comprises a pause address memory 39, an address comparator 40, a flip-flop 41, an AND gate 42, an OR gate 43, a three-input AND gate 44, a flip-flop 45, an inverter 46, an alarm 47, and timing signal generator 48.

The pause address memory 39 is connected to the control section 24. The address memory 39 is designed to store the address which the address control section 26 designates when the case 11 is stopped longer than a predetermined period after it has been moved while the handy copier 10 is set to the read mode. Hence, the address stored in the memory 39 serves to separate the image data item read by the image sensor 20 before the case 11 is stopped from the image data item to be read by the sensor 20 after the case 11 is moved again. Therefore, once these two image data items are stored in the image data memory 25, they can be accessed independently of each other.

The address (hereinafter called "pause address") stored in the pause address memory 39 is supplied to the address comparator 40 when the image data stored in the image data memory 25 printed. The address comparator 40 compares the pause address with the read address supplied from the address control section 26. When the comparator 40 determines that the pause address is identical to the read address, which has also been supplied to the image data memory 25 from the address control section 26, the control section 26 outputs a print-stop signal to the control section 2 and also to the set terminal S of the flip-flop 41. The set output Q of the flip-flop 41 is supplied to a first input of the three-input AND gate 44 through the AND gate 42 and the OR gate 43 when the handy copier 10 is set to the print mode. The read-mode signal output by the control section 24 is supplied to a second input of the AND gate 44 through the OR gate 43. The timing signal generator 48 produces clock pulses, which are supplied to the third input of the AND gate 44.

As has been described, the signals output by the encoders 30 and 31 are supplied to the reset terminal R of the counter 36 through the OR gates 35 and 37. The counter 36 counts the time during which the first encoder 30 outputs no signals while the handy copier 10 is set to the read mode. The counter 36 counts the time during which the second encoder 31 outputs no signals after the address comparator 40 has produced a print-stop signal while the handy copier 10 is set to the print mode. When the count of the counter 36 reaches a predetermined value, the counter 36 outputs a carry signal. The carry signal output from the counter 36 is supplied to the set terminal S of the flip-flop 45 and also to a second input of the AND gate 44 via the inverter 46. Further, the carry signal is supplied to the control section 24 as a read-pause signal when the handy copier 10 is set to the read mode, and as a print-renew signal when the copier 10 is set to the print mode. The set output Q of the flip-flop 45 is input to the AND gate 38, along with the signals output by the encoders 30 and 31. The output of the AND gate 38 is supplied to the reset terminals R of the flip-flops 41 and 45, and also to the reset terminal R of the counter 36 through the OR gate 37.

While the handy copier 10 is set to the read mode, the encoder 30 no longer outputs signals once the case 11 has been stopped on the original A. Thus, the count of the counter 36 increases by virtue of the clock pulses supplied from the timing signal generator 48 through the AND gate 44, and generates a carry signal. The carry signal output from the counter 36 is supplied as the read-pause signal to the control section 24. When the section 24 is supplied with the read-pause signal from the counter 36, the control section 24 supplies the address from the address control section 26 to the pause address memory 39, as a pause address. At this time, the control section 24 drives the alarm 47, whereby the user knows the copier 10 has read a piece of image data has been read from the original A and is ready to read another piece of image data therefrom.

In contrast, while the handy copier 10 is set to the print mode, the control section 24 stops the transfer of the image data from the image data memory 25 to the data-printing section 13 when the address comparator 40 determines that the pause address stored in the memory 39 is identical to the read address supplied from the address control section 26. At this time the control section 24 drives the alarm 37, thereby informing the user that the printing operation has been stopped. Thereafter, when the case 11 is stopped, the second encoder 31 stops generating signals. The count of the counter 36 therefore increases by virtue of the clock pulses supplied from the timing signal generator 46. As a result, the counter 36 outputs a carry signal. In response to this carry signal output from the counter 30, the address control section 26 designates the head address of the image data memory 25, whereby the image data stored at the head address can be read out to the data-printing section 13 and can be printed on the printing medium B. At this time, the control section 24 drives the alarm 37, thus informing the user that the copier 10 has printed a piece of image data and can now print the next piece of image data on the printing medium B.

The operation of the handy copier 10, which has been described, will now be explained, with reference to FIGS. 3 and 4.

Figure 3:
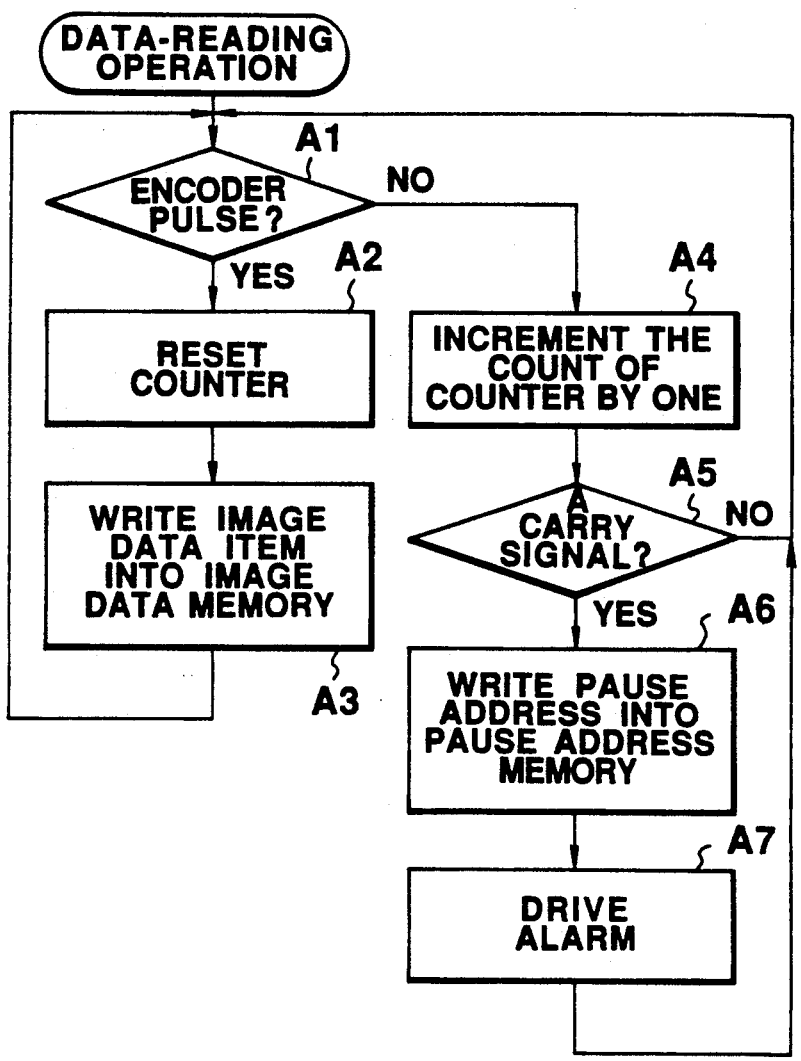
FIG. 3 is a flow chart explaining how the handy copier shown in FIG. 1 operates to read image from an original.

FIG. 3 is a flow chart explaining how the copier 10 reads the information from the original A. T read the information, such as characters and an image, the user moves the power/mode switch 18 to the read-mode position. Then, he or she holds the case 11 by hand and places it on the original A such that the paper-contacting rollers 16 is set in contact with the original A. Next, the user pushes the operation key 19, whereupon the LED driver 22 turns on the LED array 21. The user moves the case 11 on the original A, so that the image sensor 20 scans the surface of the original A, on which the information is formed. More specifically, the LED array 21 applies light onto the original A, and the light is reflected therefrom and applied to the image sensor 20.

Meanwhile, the roller 16 rotates as the case 11 is moved on the original A, whereby the disk 27 of the encoder 30 is rotated. As the disk 27 is thus rotated, the light emitted from the LED (not shown) of the detector 29 is intermittently applied through the slits 28 to the photosensor (not shown, either) of the detector 29. As a result of this, the detector 29 produces pulse signals, the number of which represents the distance the case 11 has been moved on the original A. These pulse signals are supplied, as the output signals of the encoder 30, to the control section 24 (Step A1). When the pulse signal is supplied to the reset terminal R of the counter 36 through the OR gates 35 and 37, the counter 36 is reset (Step A2).

As can be understood from the preceding paragraph, the image sensor 20 outputs image signals in response to the light reflected from the original A, in synchronism with the pulse signals produced by the first encoder 30. The image signals output from the sensor 20 are supplied to the image signal processing section 23. The section 23 converts the image signals into 8-bit parallel image data, i.e., the binary digital signals which represents the white dots and black dots defining the image formed on the original A. The 8-bit image data is supplied the control section 24. The control section 24 writes the image data into the image data memory 25. The address control section 26 designate a write address of the memory 25. To be more specific, the section 26 is controlled by the control section 24, thus incrementing the row address by one in response to each signal output by the first encoder 30, and also incrementing the column address by one in response to each 8-bit image data item output by the image signal processing section 23. After the image data, which the sensor 20 has read as the case 11 is moved ⅛ mm, is written in one column of the memory 25, which is designated by the write address, the no other image data items are written into the memory 25 until the first encoder 30 outputs the next signal (Step A3).

Steps A1 to A3 are repeated, whereby image data, which the image sensor 20 reads from the original A, are sequentially written into each column of the memory 25 in accordance the write address which the address control section 26 designates.

When all desired imag data is read by the image sensor 20, the user stops moving the case 11. Then, the first encoder 30 no longer outputs pulse signals. The operation therefore goes from Step A1 to Step A4, in which the counter 36 counts the clock pulses output by the timing signal generator 48 until either counter 36 output the carry signal or the first encoder 30 outputs the pulse signal. Upon lapse of a predetermined period (e.g., 3 seconds), the counter 36 outputs a carry signal. In Step A5, the control section 24 determines whether or not the counter 36 outputs a carry signal. Since the counter 36 has output a carry signal, the operation goes to Step A6. In Step A6, the flip-flop 45 is set, and the address control section 26 supplies the write address next to the write address which the section 26 has designated when case 11 is stopped. This write address is stored into the pause address memory 39 and will be used as a pause address.

In other words, when the case 11 remains stopped for the predetermined period after the image sensor 20 has read the image data from the original A, and this image data has been written into the image data memory 25, the address control section 26 writes the next write address, or the pause address, into the pause address memory 39. The pause address, thus stored into the memory 39, serves as a pause code separating the image data item stored in the memory 25 before the case 11 is stopped, from the image data item which is to be stored into the memory 25 when the case 11 is moved again.

When the pause address is written into the pause address memory 39, the control section 24 drives the alarm 47. The alarm 37 informs the user that the pause address has been stored into the memory 39 (Step A7).

Figure 4:
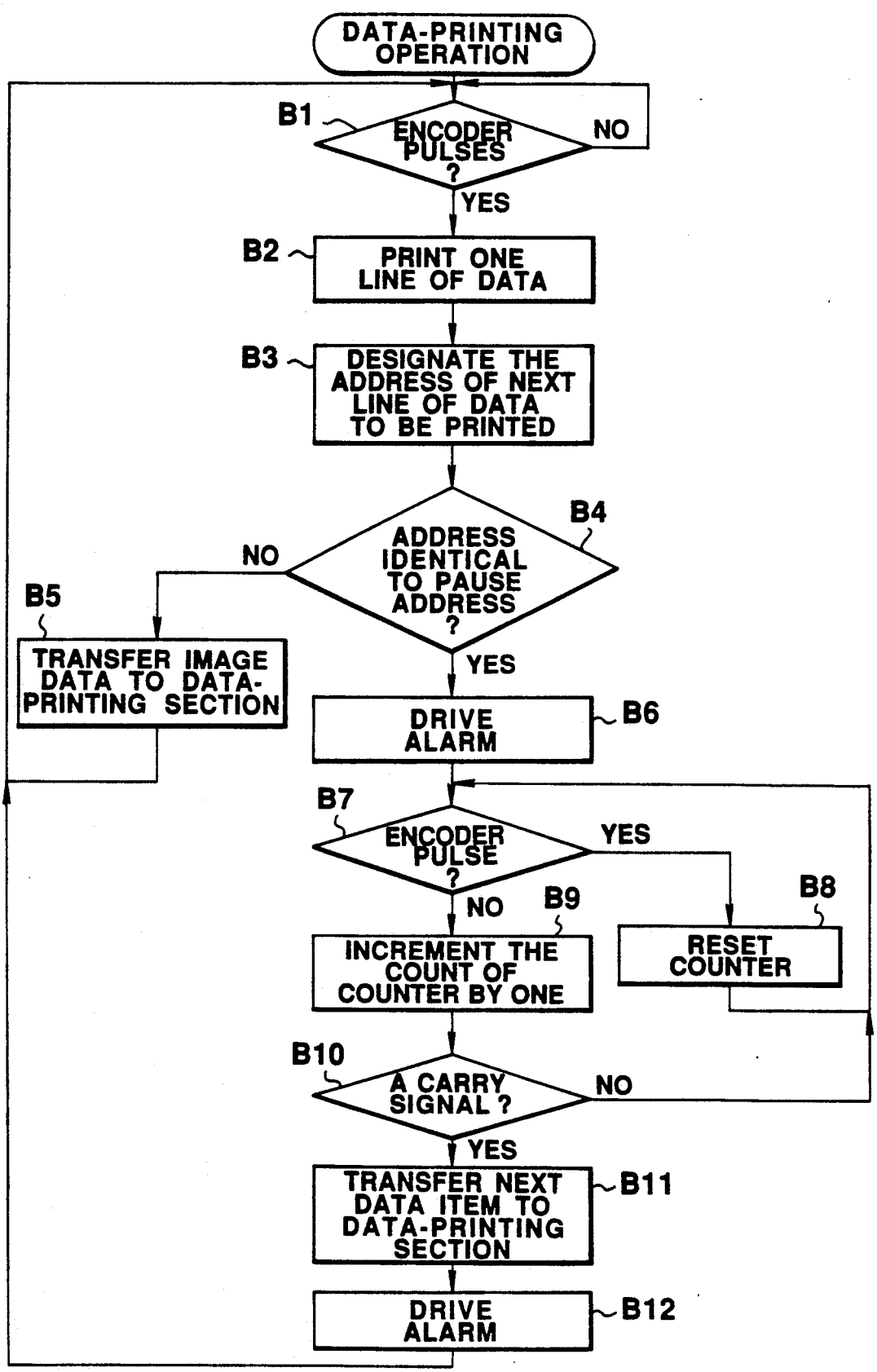
FIG. 4 is a flow chart explaining how the handy copier illustrated in FIG. 1 operates to print image on a printing medium.

FIG. 4 is a flow chart explaining how the hand copier 10 is operated to print, on the printing medium B, the image data which has been read from the original A and stored into the image data memory 25.

To print the image data on the printing medium B, the user moves the power/mode switch 18 to the print-mode position. As a result, the handy copier 10 is set to the print mode. Then, the user hold the copier 10 and places it on the printing medium B (e.g., a leaf of a notebook), with the paper-contacting rollers 17 put in contact with the medium B. In this condition, the thermal print head 14 presses the ink ribbon 15 onto the printing medium B. The user then moves the case 11 on the medium B, while pushing the operation key 19. As the case 11 is thus moved, the rollers 17 are rotated, thus rotating the encoder disk 32 coupled to the roller 17. As the disk 32 is thus rotated, the light emitted from the LED (not shown) of the detector 34 is intermittently applied through the slits 33 to the photosensor (not shown, either) of the detector 34. As a result of this, the detector 34 produces pulse signals, the number of which represents the distance the case 11 has been moved on the printing medium B. These pulse signals are supplied, as the output signals of the encoder 31, to the control section 24 (Step B1). The control section 24 controls the address control section 26. Under the control of the section 24, the address control section 26 designates the column addresses of the memory 25 sequentially, and also the low addresses thereof sequentially. Hence, the image data stored in the image data memory 25 is read out, column by column, to the data-printing section 13 though the control section 24. In synchronism with the pulse signals output by the second encoder 31, the section 13 prints one line of image data, i.e., the data supplied from the control section 24, column by column (Step B2). Next, the control section 24 controls the address control section 26 so that the section 26 designate that address of the image data memory 25 at which the next column of image data to be printed is stored (Step B3). The address comparator 40 compares the address thus designated, with the pause address stored in the pause address memory 39 (Step B4). In other words, it is determined in Step B4 whether or not the address is identical to the pause address. If NO in step B4, that is, if the read address is not identical to the pause address, i.e., the head address of the next image data item, the operation goes to Step B5. In Step B5, the next column of image data stored in that address of the image data memory 25 which has been designated in Step B3 is read from the image data memory 25 and supplied to the data-printing section 13 through the control section 24.

Thus, as the user moves the handy copier 10 on the printing medium B, Steps B1 to B5 are repeated, whereby the image data stored in the image data memory 25 is transferred, line by line, to the data-printing section 13. Eventually, the data-printing section 13 prints the image data, line by line, on the printing medium B.

If YES in Step B4, that is, if the read address is identical to the pause address, i.e., the head address of the next image data item, the operation goes to Step B6. In Step B6, the control section 24 stops transferring the image data from the memory 25 to the data-printing section 13, and drives the alarm 47, thereby informing the user that the image data has been printed on the printing medium B. Hearing the alarm, the user stops moving the handy copier 10 on the medium B. If the user keeps moving the copier 10 even after the image data has been printed, the second encoder 31 continue to output pulse signals (Step B7). These pulse signals reset the counter 36 repeatedly (Step B8).

When the user stops moving the copier 10 after the image data has been printed on the printing medium B, the second encoder 31 no longer generates pulse signals. Then, the counter 36 stars counting the clock pulses output by the timing signal generator 46 (Step B9). In other words, the counter 36 starts measuring time. If the handy copier has been stopped for the predetermined period (e.g., 3 seconds) thereafter, the counter 36 outputs a carry signal (Step B10). In response to this carry signal, the address control section 26 designates the head address of the next image data item, which the control section 24 has found identical with the designated read address in Step B4. Then, the control section 24 transfers the next image data item (i.e., a one-column of the image data) from the image data memory 25 to the data-printing section 13 (Step B11).

That is, when the address comparator 40 determines that the read address of the memory 25 which has last been designated is identical the pause address stored in the pause address memory 39 while the handy copier 10 is moved for printing the image data, the control section 24 stops transferring image data from the image data memory 25 to the data-printing section 13. Hence, the data-printing section 13 prints only one image data item at a time. If the case 11 is not moved for the predetermined period (e.g., 3 seconds), the control section 24 transfers the next image data item from the memory 25 to the data-printing section 13, whereby the section 13 is prepared to print the next image data item on the printing medium B.

When the next one-line image data is transferred to the data-printing section 13, the control section 24 drives the alarm 47. The alarm 47 generates an alarm forthwith, so as to inform the user that the next one-line image data can be printed (Step B12).

As can be understood from the above description, when the handy copier 10 is moved on the original A, it performs sub-scanning on the original A, thus reading the original A. In addition, when the copier 10 is moved on the printing medium B, it prints on the medium B the image data which has been read from the original A. Furthermore, since the pause addresses, which serve as pause codes separating different image data items from one another, are automatically controlled, the image data items can be printed distinct from one another even if they have been continuously stored into the image data memory 25.

In the embodiment described above, the head address of an image data item is stored in the pause address 39 and is used as a pause address for separating the image data item from the immediately preceding image data item. Instead, a pause code can be written into the image data memory 25. More specifically, when the the user stops moving the case 11 after the image sensor 12 has read an image data item, and the counter 36 then outputs a carry signal upon lapse of the predetermined period of time, the pause code distinct from the image data read by the sensor 12 is written into the image data memory 25 after said image data item. When this pause code is read from the memory 25 during the printing operation, the printing operation is interrupted. In this case, too, a plurality of image data items can be continuously read from the original A and stored into the image data memory 25, and can yet be printed separately on the printing medium B.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image data processing apparatus comprising:
    housing means movable on a material having image information thereon;
    input means carried by said housing means, for producing image data from the image information on the material when said housing means is moved on the material, and for producing image data from the image information on the material;
    memory mean for storing the image data produced by said input means;
    movement-detecting means for detecting movement of said housing means with respect to the material and for outputting a detecting signal as said housing means moves relative to the material;
    stop determining means for determining a stopping of movement of said housing means relative to the material and for outputting a determining signal responsive to said stopping of said housing means: and
    memory control means for controlling said memory means in accordance with detecting signals output from said movement-detecting means, and for separating the image data stored in said memory means into a plurality of separated image data items, in response to the determining signal output from said stop determining means, so as to be able to output the separated image data items from said memory means one-by-one.

2. The image data processing apparatus according to claim 1, wherein:
    said movement-detecting means includes position-detecting means for detecting a position of said housing means with respect to the material, and for outputting a position signal every time said housing means is moved on the material for a predetermined distance;

said stop determining means includes time-measuring means for measuring a time interval at which said position-detecting means sequentially outputs two position signals, and for outputting the determining signal when the measured time interval is equal to or longer than a predetermined time interval; and said memory control means includes data-end determining means for determining the end of each image data item in response to the determining signal output from said stop determining means.

3. The image data processing apparatus according to claim 2, wherein said memory control means includes;

address-designating means for designating an address of said memory means in accordance with the position signal output from said position-detecting means; and address-data storing means for storing address data representing that address of said memory means which said address-designating means designates when said stop determining means outputs the determining signal.

4. The image data processing apparatus according to claim 3, further including: data-outputting means for outputting each image data item stored in said memory means, and wherein said memory means includes data-supplying means for supplying each image data item from said memory means to said data-outputting means in accordance with the address data stored in said address-data storing means.

5. The image data processing apparatus according to claim 4, wherein said data-supplying means includes:

read-address designating means for designating read addresses of said memory means in sequence;

address-comparing means for comparing each read address designated by said read-address designating means, with the address data stored in said address-data storing means, and for outputting a coincidence signal when the read address designated by said read-address designating means coincides with the address data stored in said address-data storing means; and data-supply stopping means for stopping the supply of the image data from said memory means to said data-outputting means when said comparing means outputs the coincidence signal.

6. The image data processing apparatus according to claim 5, wherein:

said housing means moves on a printing medium;

said data-outputting means includes printing means carried by said housing means, for printing the image data supplied from said memory means on the printing medium;

said position-detecting means includes means for detecting the position of said housing means with respect to the printing medium, and for outputting a position signal every time said housing means is moved for a predetermined distance on the printing medium; and said data-supplying means includes data-supply renewing means for renewing the supply of image data from said memory means to said data-outputting means when said stop determining means outputs the determining signal after said data-supply stopping means has stopped the supply of image data.

7. The data processing apparatus according to claim 1, further including: data-outputting means for outputting each image data item stored in said memory means, and wherein said memory means includes data-supplying means for supplying each image data item from said memory means to said data-outputting means.

8. The image data processing apparatus according to claim 7, wherein:

said movement-detecting means includes position-detecting means for detecting the position of said housing means with respect to the material, and for outputting a position signal every time said housing means is moved on the material for a predetermined distance;

said stop determining means includes time-measuring means for measuring a time interval at which said position-detecting means sequentially outputs two position signals, and for outputting the determining signal when the time interval measured by said time-measuring means is equal to or longer than a predetermined time interval; and said memory control means includes data-end determining means for determining the end of each image data item in response to the determining signal output from said stop determining means.

9. The image data processing apparatus according to claim 8, wherein said memory control means includes:

write-address designating means for designating a write address of said memory means in accordance with the position signal output by said position-detecting means; and address-data storing means for storing address data corresponding to that write address of said memory means which said write-address designating means designates every time said stop determining means outputs the determining signal.

10. The image data processing apparatus according to claim 9, wherein said data-supplying means includes:

read-address designating means for designating read addresses of said memory means in sequence;

address-comparing means for comparing read address designated by said read-address designating means, with the address data stored in said address-data storing means, and for outputting a coincidence signal when the read address designated by said read-address designating means coincides with the address data stored in said address-data storing means; and data-supply stopping means for stopping the supply of data from said memory means to said data-outputting means when said comparing means outputs the coincidence signal.

11. The image data processing apparatus according to claim 10, wherein:

said housing means moves on a printing medium said data-outputting means includes printing means located in said housing means, for printing the image data supplied from said memory means on the printing medium;

said position-detecting means includes means for detecting the position of said housing means with respect to the printing medium, and for outputting a position signal every time said housing means is moved for a predetermined distance on the printing medium; and said data-supplying means includes data-supply renewing means for renewing the supply of image data from said memory means to said data-outputting means when said time-measuring means outputs the determining signal after said data-supply stopping means has stopped the supply of image data.

12. An image data processing apparatus comprising:
   input means for inputting a plurality of image data items;
   memory means for storing the image data items input by said input means;
   housing means movable on a printing medium;
   printing means carried by said housing means for printing the image data stored in said memory means, on the printing medium while said housing means is being moved on the printing medium;
   movement-detecting means for detecting movement of said housing means with respect to the printing medium;
   stop detecting means for detecting that said housing means stops moving:
   data-selecting means for sequentially selecting one of the image data items stored in said memory means, every time said stop detecting means detects that said housing means stops moving; and
   data-supplying means for supplying the image data item selected by said data-selecting means, from said memory means to said printing means, in accordance with the movement of said housing means detected by said movement detecting means.

13. The image data processing apparatus according to claim 12, wherein said movement-detecting means includes position-detecting means for detecting the position of said housing means with respect to the printing medium, and for outputting a position signal every time said housing means is moved on the printing medium for a predetermined distance;
   said stop detecting means includes time-measuring means for measuring an interval at which said position-detecting means sequentially outputs two position signals, and for outputting a time signal when the interval is equal to or longer than a predetermined time;
   said data-selecting means includes means for sequentially selecting one of the image data items stored in said memory means, every time said time-measuring means outputs the time signal; and
   said data-supplying means includes means for supplying each image data item selected by said data-selecting means, from said memory means to said memory means to said printing means in response to the position signal output from said position-detecting means.

14. The image data processing apparatus according to claim 13, further including: address-data storing means for storing address representing that address of said memory means at which the end of each image data item is stored, and wherein said data-selecting means includes address-data selecting means for selecting the address data stored in said address-data storing means, which represents the end of the image data item to be selected and, said data-supplying means includes:
   read-address designating means for designating read addresses of said memory means in sequence in response to the position signals output from said position-detecting means;
   address-comparing means for comparing read address designated by said read-address designating means, with the address data selected by said address-data selecting means for outputting a coincidence signal when the read address designated by said read-address designating means coincides with the address data selected by said address-data selecting means; and
   stopping means for stopping designation of the read-address by said read-address designating means when said comparing means outputs the coincidence signal, so as to stop supplying of the image data items from said memory means to said printing means.

15. The image data processing means according to claim 14, wherein said data-selecting means includes:
   restarting means for renewing designation of the read-address by said read-address designating means when said time-measuring means outputs a time signal after said stopping means has stopped said read-address designating means; and
   address-data changing means for changing the address data selected by said address-data selecting means when said time-measuring means outputs a time signal after said stopping mean has stopped designation of the read-address by said read-address designating means.

16. The image data processing apparatus according to claim 12, wherein:
   said housing means moves on a material having image information;
   said movement-detecting means includes means for detecting the movement of said housing means with respect to the material and for outputting detecting signals as said housing means moves; and
   said input means includes image-data input means carried by said housing means, for inputting image data corresponding to the image information read from said material,
   further comprising:
   memory control means for controlling said memory means in accordance with the detecting signals output from said movement-detecting means, and for separating the image data stored in said memory means, into a plurality of image data items in response to said stop detecting means detecting that said housing means stops moving so as to be able to output the image item from said memory means one by one.

17. The image data processing apparatus according to claim 16, wherein:
   said movement-detecting means includes position-detecting means for detecting the position of said housing means with respect to the material, and for outputting a position signal every time said housing means is moved on the material for a predetermined distance;
   said stop detecting means includes time-measuring means for measuring an interval at which said position-detecting means sequentially outputs two position signals, and for outputting a time signal when the interval is equal to or longer than a predetermined time; and
   said memory control means includes data-end detecting means for detecting the end of each image data item in response to the time signal output from said time-measuring means.

18. The image data processing apparatus according to claim 17, wherein said memory control means includes:
   write-address designating means for designating a write address of said memory means in accordance with the position signal output by said position-detecting means; and address-data storing means for storing the address data corresponding to the write address of said memory means which said write-address designating means designates every time said time-measuring means outputs the time signal, said address data representing the end of each image data item.

19. The image data processing apparatus according to claim 18, wherein said position-detecting means includes means for detecting the position of said housing means with respect to the printing medium, and for outputting a position signal every time said housing means is moved for a predetermined distance on the printing medium, said data-selecting means includes means for sequentially selecting one of the image data items stored in said memory means, every time said time-measuring means outputs a time signal; and said data-supplying means includes means for supplying each image data item selected by said data-selecting means, from said memory means to said printing means in response to the position signal output from said position-detecting means.

20. The image data processing apparatus according to claim 19, wherein said data-selecting means includes address-data selecting means for selecting the address data stored in said address-data storing means, which represents the end of the image data item to be selected, said data-supplying means includes:
   read-address designating means for designating read addresses of said memory means in sequence in response to the position signals output from said position-detecting means;
   address-comparing means for comparing read address designated by said read-address designating means, with the address data selected by said address-data selecting means for outputting a coincidence signal when the read address designated by said read-address designating means coincides with the address data selected by said address-data selecting means; and
   stopping means for stopping designation of the read-address by said read-address designating means when said comparing means outputs the coincidence signal, so as to stop supplying of the image data items from said memory means to said printing means.

21. The image data processing means according to claim 20, wherein said data-selecting means includes:
   renewing means for renewing designation of the read-address by said read-address designating means when said time-measuring means outputs a time signal after said stopping means has stopped said read-address designating means; and
   address-data changing means for changing the address data selected by said address-data selecting means when said time-measuring means outputs the time signal after said stopping means has stopped said read-address designating means.

22. The image data processing apparatus according to claim 12, wherein aid image data items stored in said memory means are separated into separated image data items which are supplied by said data-supplying means to said printing means on a one-by-one basis.

23. An image data processing apparatus comprising:
   housing means movable on a material having image information thereon;
   input means carried by said housing means, for producing image data from the image information on the material when said housing means is moved on the material, and for producing image data from the image information;
   memory means for storing the image data produced by said input means;
   position-detecting means for detecting the position of said housing means with respect tot he material, and for outputting a position signal every time said housing means is moved on the material for a predetermined distance;
   time-measuring means for measuring an interval at which said position-detecting means sequentially output two position signals, and for outputting a time signal when the interval is equal to or loner than a predetermined time;
   address-designating means for designating an address of said memory means in accordance with the position signal output from said position-detecting means; and
   address-data storing means for storing address data representing that address of said memory means which said address-designating means designates when said time-measuring means outputs a time signal.

24. The image data processing apparatus according to claim 23, further comprising:
   data-outputting means for outputting each image data item stored in said memory means, wherein said memory means includes data-supplying means for supplying each image data item from said memory means to said data-outputting means in accordance with the address data stored in aid address-data storing means.

25. The image data processing apparatus according to claim 24, wherein said data-supplying means includes:
   read-address designating means for designating read address of said memory means in sequence;
   address-comparing means for comparing each read address designated by said read-address designating means, with the address data stored in said address-data storing means, and for outputting a coincidence signal when the read address designated by said read-address designating means coincide with the address data stored in said address-data storing means; and
   data-supply stopping means for stopping the supply of the image data from said memory means to said data-outputting means when said comparing means outputs a coincidence signal.

26. The image data processing apparatus according to claim 25, wherein:
   said housing means moves on a printing medium;
   said data-outputting means includes printing means carried by said housing means, for printing the image data supplied from said memory means, on the printing medium
   said position-detecting means includes means for detecting the position of said housing means with respect to the printing medium, and for outputting a position signal every time said housing means is moved for a predetermined distance on the printing medium; and
   said data-data-supplying means includes data-supply renewing means for renewing the supply of the image data from said memory means to said data-outputting means when said time-measuring means outputs the time signal after said data-supply stopping means has stopped the supply of the image data.

27. An image data processing apparatus comprising:
input means for inputting a plurality of image data items;
memory means for storing the image data items input by said inputting means;
housing means movable on a printing medium;
printing means carried by the housing means for printing the image data stored in said memory means, on the printing medium while said housing means is being moved on the printing medium;
position detecting means for detecting the position of said housing means with respect to the printing medium, and for outputting a position signal every tine said housing means is moved on the printing medium for predetermined distance;
time-measuring means for measuring an interval at which said position-detecting means sequentially outputs two position signals, and for outputting a time signal when the interval is equal to or longer than a predetermined time;
address-data storing means for storing data representing that address of said memory means at which the end of each image data item is stored;
data-selecting means for sequentially selecting one of the image items stored in said memory means, every time said time-measuring means outputs the time signal;
address-data selecting means for selecting the address data stored in said address-data storing means, which represents the end of the image data item selected by said data-selecting means;
read-address designating means for designating read address of said memory means in sequence in response to the position signals output from said position-detecting means;
data-supplying means foe supplying the image data from said memory means according to the read address designated by said read-address designating means;
address-comparing means for comparing read address designated by said read-address designating means, with the address data selected by said address-data selecting means, and for outputting a coincidence signal when the read address designated by said read-address designating means coincides with the address data selected by said address-data selecting means; and
stopping means for stopping designating of the read-address by said read-address designating means when said comparing means outputs the coincidence signal, so as to stop supplying of the image data items from said memory means to said printing means.

28. The image data processing apparatus according to claim 27, further comprising:
renewing means for renewing designation of the read address by said read-address designating means when said time-measuring means outputs a time signal after said stopping means has stopped said read-address designating means; and
address-data changing means for changing the address data selected by said address-data selecting means when said time-measuring means outputs a time signal after said stopping means has stopped designation of the read-address by said read-address designating means.

29. The image data processing apparatus according to claim 27, wherein:
said housing means moves on a material having image information;
said position detecting means includes means for detecting the position of said housing mans with respect tot he material, and for outputting a position signal every time said housing means is moved on the material for a predetermined distance; and
said input means includes image-data input means carried by said housing means, for inputting image data correspondence to the image information read from said material,
further comprising:
writing-address designating means for designating a write address of said memory means in accordance with the position signal output by said position-detecting means; and
address-data storing means for storing the address data corresponding to the write address of said memory means which said write-address designating means designates every time said time-measuring means outputs a time signal, said address data representing the end of each image data item.

30. An image data processing apparatus comprising:
housing means movable on one of a material having image information thereon and a printing medium;
image-data input means carried by said housing means, for inputting image data corresponding to image information read from the material while said housing means is being moved on the material;
memory means for storing image data input by said image-data input means;
printing means, carried by said housing means, for printing the image data stored in said memory means, on the printing medium, while said housing means is being moved on the printing medium;
position-detecting means for detecting the position of said housing means with respect to one of the material and the printing medium, and for outputting a position detecting signal every time said housing means is moved on one of the material and the printing medium for a predetermined distance;
time-measuring means for measuring an interval at which said position-detecting means sequentially outputs two position signals, and for outputting a time signal when the interval is equal to or longer than a predetermined time;
memory control means for controlling said memory means in accordance with the position signals output from said position-detecting means, and for separating the image data into a plurality of separated image data items, each produced by said image-data input means;
said memory control means including:
write-address designating means for designating a write address of said memory means in accordance with the position signal output by said position-detecting means; and
address-data storing means for storing the address data corresponding to the write address of said memory means, which said write-address designating means designates every time said time-measuring means outputs the time signal, said address data representing the end of each separated image data item;

data-selecting means for sequentially selecting one of the separated image data items stored in said memory means, every time said time-measuring means outputs the time signal; and data-supplying means for supplying each separated image data item selected by said data-selecting means, from said memory means to said printing means, in response to the position signal output form said position-detecting means.

31. The image data processing apparatus according to claim 30, wherein:

said data-selecting means includes address-data selecting means for selecting the address data stored in said address-data storing means, which represents the end of the image data item to be selected; and said data supplying means includes:

read-address designating means for designating read addresses of said memory means in sequence in response to position signals output form said position-detecting means;

address-comparing means for comparing a read address designated by said read-address designating means with address data selected by said address-data selecting means, for outputting a coincidence signal when the read address designated by said read-address designating means coincides with the address data selected by said address-data selecting means; and stopping means for stopping designation of the read-address by said read-address designating means when said read-address comparing means outputs the coincidence signal, so as to stop supplying of the image data items from said memory means to said printing means.

32. The image data processing means according to claim 31, wherein said data-selecting means includes:

renewing means for renewing designation of the read-address by said read-address designating means when said time-measuring means outputs the time signal after said stopping means has stopped said read-address designating means; and address-data changing means for changing the address data selected by said address-data selecting means when said time-measuring means outputs the time signal after said stopping means has stopped said read-address designating means.

* * * * *